United States Patent [19]

Underwood et al.

[11] Patent Number: 5,723,857
[45] Date of Patent: Mar. 3, 1998

[54] METHOD AND APPARATUS FOR DETECTING CRACKS AND STRAINS ON STRUCTURES USING OPTICAL FIBERS AND BRAGG GRATINGS

[75] Inventors: Fiona Underwood; Andrew Ball, both of Farnborough, Great Britain

[73] Assignee: British Aerospace Public Limited Company, Hampshire, Great Britain

[21] Appl. No.: 646,868

[22] Filed: May 8, 1996

Related U.S. Application Data

[63] Continuation of Ser. No. 294,397, Aug. 23, 1994, abandoned.

[30] Foreign Application Priority Data

Aug. 24, 1993 [GB] United Kingdom .................. 9317576

[51] Int. Cl.$^6$ ........................................... G01N 3/80
[52] U.S. Cl. ............... 250/227.14; 250/227.15; 250/227.16; 385/13; 385/114; 356/73.1
[58] Field of Search ........................ 250/227.14, 227.15, 250/227.16; 73/800, 802, 803; 356/73.1, 237; 385/12, 13, 114

[56] References Cited

U.S. PATENT DOCUMENTS

| | | | |
|---|---|---|---|
| 4,496,215 | 1/1985 | Shaheen et al. | 350/96.23 |
| 4,603,252 | 7/1986 | Malek et al. | 250/227.14 |
| 4,629,318 | 12/1986 | Malek et al. | |
| 4,692,610 | 9/1987 | Szuchy | |
| 4,733,068 | 3/1988 | Thiele et al. | 250/227.14 |
| 4,808,814 | 2/1989 | Hofer et al. | |
| 4,840,480 | 6/1989 | Starke et al. | |
| 4,936,649 | 6/1990 | Lymer et al. | 350/96.29 |
| 4,996,419 | 2/1991 | Morey | 250/227.18 |
| 5,013,908 | 5/1991 | Chang | |
| 5,038,618 | 8/1991 | Malvern | |
| 5,142,141 | 8/1992 | Talat et al. | |
| 5,182,449 | 1/1993 | Johnson et al. | 250/227.14 |
| 5,187,362 | 2/1993 | Keeble | 250/227.15 |
| 5,278,499 | 1/1994 | Ito et al. | 324/244.1 |
| 5,399,854 | 3/1995 | Dunphy et al. | 250/227.17 |

FOREIGN PATENT DOCUMENTS

| | | |
|---|---|---|
| 3142392 | 5/1983 | Germany . |
| 3629430 | 3/1988 | Germany . |
| 2136119 | 9/1984 | United Kingdom . |
| 2145515 | 3/1985 | United Kingdom . |

OTHER PUBLICATIONS

Measures et al, "Wavelength demodulated Bragg grating fiber optic sensing systems for addresing smart structure critical issues," Smart Mater. Struct 1 (1992), printed in UK, pp. 36–44.

*Primary Examiner*—Stephone B. Allen
*Attorney, Agent, or Firm*—Cushman, Darby & Cushman IP Group of Pillsbury, Madison & Sutro LLP

[57] ABSTRACT

A method of measuring structural defects of a structure including the steps of: a) attaching to the structure at least one structural defect sensor each including a fibre optic cable in turn including a plurality of longitudinally extending optical fibres mounted in a predetermined spaced apart substantially parallel co-planar array, selected fibres having Bragg Gratings located along their length in their surfaces, one side of the array being adapted for attachment to a surface of a structure to be tested, b) coupling to one end of the fibre optic cable of each sensor a light source, and an optical sensor having time domain measuring and multiplexing capabilities, and, c) monitoring a variation of a light parameter measured by the optical detector using time domain measurement to locate the position of a crack along a fibre and using multiplexing for determining from which fibre the light source is being analyzed, and d) monitoring point strains by measuring a characteristic of light reflected from the Bragg Gratings.

2 Claims, 3 Drawing Sheets

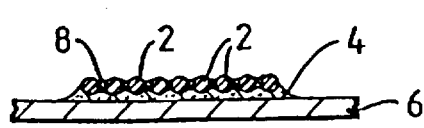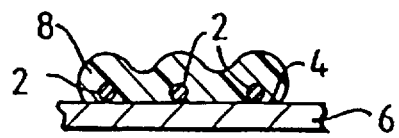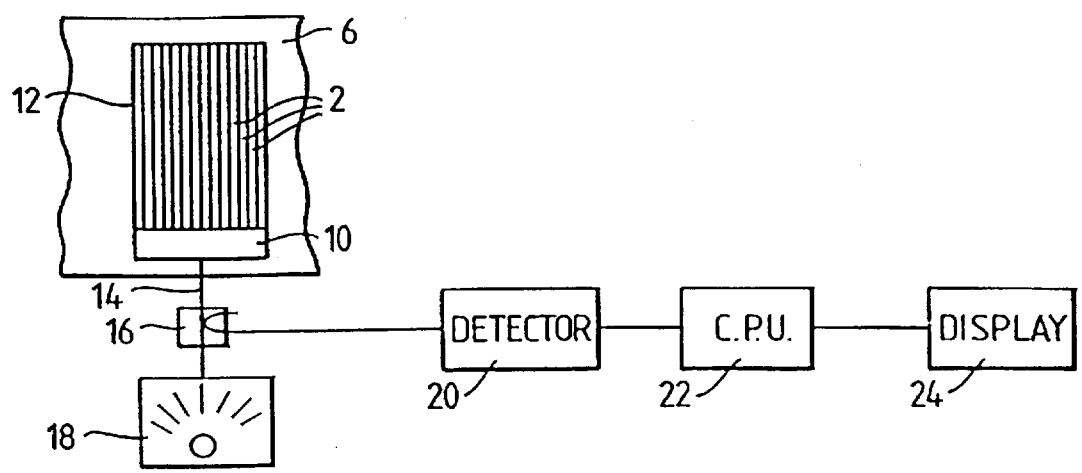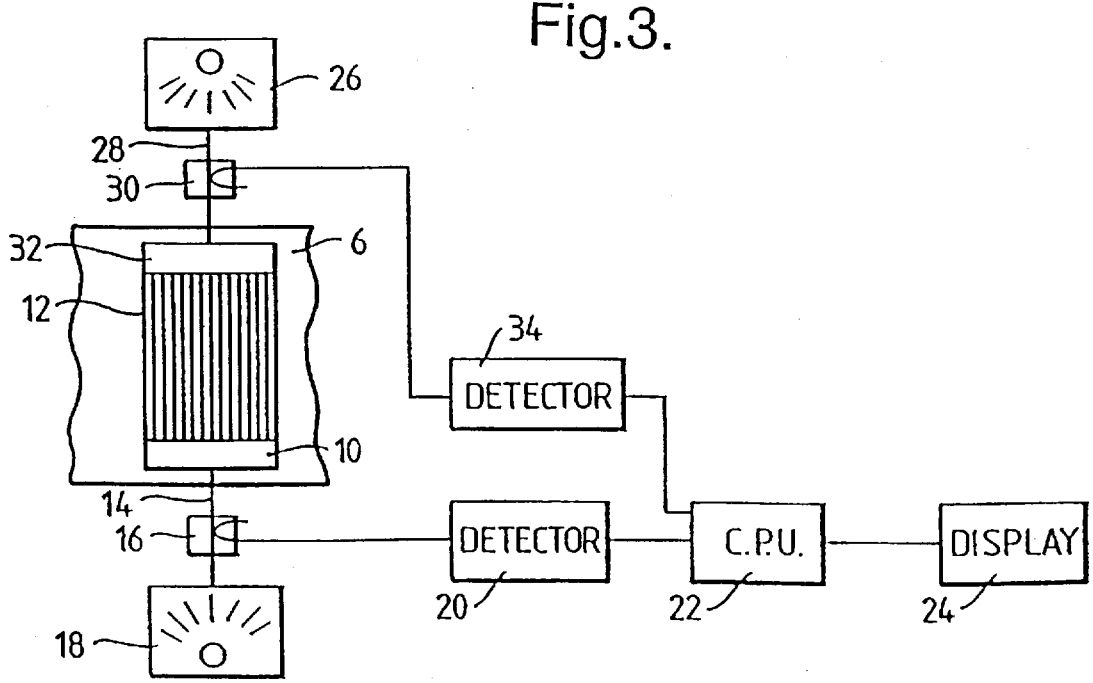

METHOD AND APPARATUS FOR DETECTING CRACKS AND STRAINS ON STRUCTURES USING OPTICAL FIBERS AND BRAGG GRATINGS

This is a continuation of application Ser. No. 08/294,397, filed on Aug. 23, 1994, which was abandoned upon the filling hereof.

BACKGROUND OF THE INVENTION

1. Field of the Invention

This invention relates to structural damage detection systems, and more particularly to structural damage detection systems utilizing optical fibres.

2. Description of the Related Art

The use of surface mounted deformation and damage detection systems for the monitoring of structural integrity within metallic, ceramic or composite structures is well known within the construction and aerospace industries.

The monitoring of the structural integrity of any structure or "structural health" to which it is sometimes referred, consists of the measurement of a number of parameters usually including crack growth, crack direction and point strain measurement. In the field of fibre reinforced composites various techniques have been proposed for the measurement of crack and strain properties. These usually comprise of embedding the sensory device or fibre in the lay-up of the composite thus requiring detailed and specialist manufacturing techniques. In the field of metallic, ceramic and civil engineering construction, crack detection is usually conducted using "tell tales". Tell tales comprise thin sections of either glass, conductive wire or cotton which when fastened to the structure will break as a crack propagates between their fastened length. Tell tales give a visual indication of crack propagation or in the case of conductive wire can be arranged to give an electrical indication (i.e. breakage). Allied to the measurement of structural health strain measurement is usually conducted using metallic strain gauges bonded onto the surface of a structure. A recent advance in fibre optic technology was the use of "Bragg" gratings which are patterns laser etched onto a single glass fibre which perform a similar function to a conventional strain gauge but on a far reduced physical scale.

The monitoring of structural health therefore requires the combination of a number of techniques for different materials if it is to be conducted in situ i.e. from within or attached to the structure, as opposed to the traditional external non-destructive test techniques such as eddy current sensing or dye penetrant methods.

SUMMARY OF THE INVENTION

It is an object of the present invention to provide a structural damage detection system which may be employed with structures of any material required to be monitored.

It is another object of the present invention to provide a structural damage detection system which provides for the simultaneous monitoring of crack positioning, propagation rate, direction and point strain levels.

According to the present invention in one aspect thereof a method of measuring structural defects of a structure includes the steps of:

a) Attaching to said structure at least one structural defect sensor comprising a fibre optic cable in turn comprising a plurality of longitudinally extending optic fibres mounted in a predetermined spaced apart substantially parallel co-planer array selected fibres having Bragg Gratings located along their length in their surface, one side of said array being adapted for attachment to a surface of a structure to be tested, b) coupling one end of the fibre optical cable of each sensor to a light source, and an optical detector having time domain measuring and multiplexing capabilities, c) monitoring a variation of a light parameter measured by said optical detector, using time domain measurement to locate the position of a crack along a fibre and using multiplexing for determining from which fibre the light source is being analyzed, and d) monitoring point strians by measuring a characteristic of light reflected from said Bragg Gratings.

According to the present invention in another aspect thereof there is provided a structural defect sensor comprising a fibre optic cable in turn comprising a plurality of longitudinally extending optical fibres mounted in a predetermined spaced apart substantially parallel co-planar array one side of said array being adapted for attachment to a surface of a structure to be tested, selected fibres having Bragg Gratings thereon, said sensor also comprising an optical switch, a light source and a detector located at one end of the fibre optic cable.

Optionally, the method may include the further steps of locating a second light source, with a corresponding optical switching unit and detector, at another end of said cable, thereby enabling reflecting of light from both ends of said cable to be monitored and thereby the positioning of any discontinuity on an individual fibre within said cable to be accurately established.

Optionally, the structural defect sensor may comprise an additional light source, optical switch and detector located at another end of said cable.

An embodiment of the invention will now be explained by way of a non-limiting example in which the following figures will be referred to:

BRIEF DESCRIPTION OF THE DRAWINGS

FIGS. 1A and 1B are cross sectional views of optical fibre ribbon cable assemblies mounted on structures to be tested, FIG. 2 is a block schematic diagram of apparatus used in a typical structural health monitoring scenario, FIG. 3 is a block schematic diagram of an alternative arrangement to that of FIG. 2 for structural health monitoring.

DESCRIPTION OF THE PREFERRED EMBODIMENTS

Figure 4:
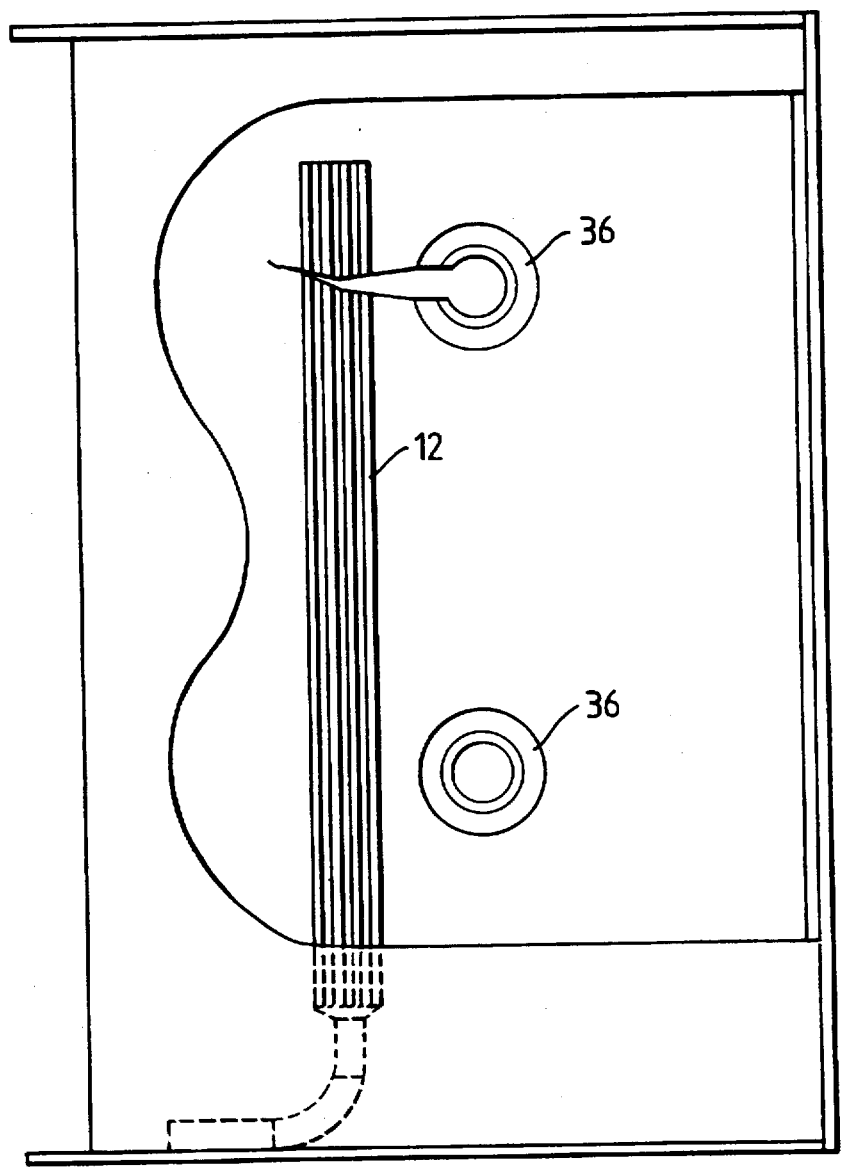
FIG. 4 is a plan view of a structure under test showing the effects of crack propagation on the optical fibre ribbon cable of FIG. 1A or FIG. 1B.

Referring to FIGS. 1A and 1B an array of co-planar parallel optical fibres 2 are bonded together and held in a matrix 8 which may be of either polymer or elastomeric composition. This arrangement of fibres is known as a "ribbon cable" which additionally can have some pre-impregnated adhesive surface incorporated on one side 4 to enable the cable to be bonded to a typical surface 6 shown here as metallic.

FIG. 2 shows apparatus which may be used in an application for monitoring both crack properties and point strain measurements. A ribbon cable 12, comprising fibre optic cables 2 is bonded to the surface of a structure 6 using the adhesive pre-impregnated on the ribbon cable 12. The ribbon cable 12 is then fastened to an end connector 10 which combines the optical fibres 2 into a fibre bundle 14 which connects via an optical switch 16 to a light source 18.

The light from source 18 is directed along fibre bundle 14, through the optical switch 16 and into the ribbon end connector 10. The light is then passed along each individual optical fibre within which the light reflects internally either at its end position or at a break point within the ribbon 12. The reflected light travels back through the connector 10 into the fibre bundle 14 and via the optical switch 14 to a detector unit 20. In the detector unit 20 the optical signals are converted to digital or analogue form before being sent to the CPU 22 for processing. Once processed the CPU 22 outputs the information obtained to a display means 24 comprising either video or printer or alternative display format.

FIG. 3 shows an alternative arrangement to FIG. 2 whereby a second light source 26, optical switching unit 30 and detector 34 are utilised in combination with the apparatus described in FIG. 2. The reflection of light from both ends of a ribbon cable will result in two signals requiring processing by the CPU 22 and thus enables the positioning of any discontinuity on an individual fibre 2 to be more accurately established.

The detection system 20 and 34 will use an appropriate method for determining the distance of the fibre discontinuity from the light source or end connector reference position, such as time domain measurement, and a multiplexing system for determining from which fibre the light source is being analysed.

Figure 6:
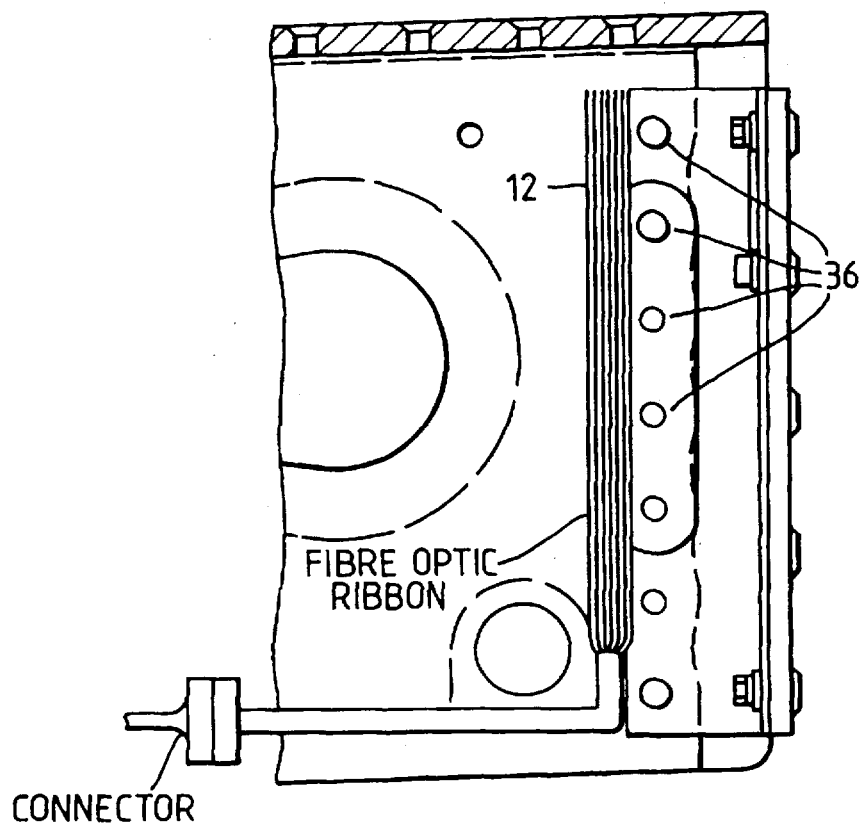
FIG. 6 is a plan view showing a typical application of the apparatus according to the invention to aircraft structural health monitoring.

By way of an example of the invention's application to structural health monitoring, FIG. 6 shows an optical fibre ribbon cable 12 positioned adjacent to a line of fasteners 36 in a typical aircraft structure.

FIG. 4 shows the effect of crack propagation across the fibre direction of the ribbon cable and thus the damage to the fibres that will be detected by analysis.

Additionally, the fibres within the ribbon cable can be utilized to monitor point strain measurements by the inclusion of Bragg Gratings along the length of specific fibres.

Figure 5:
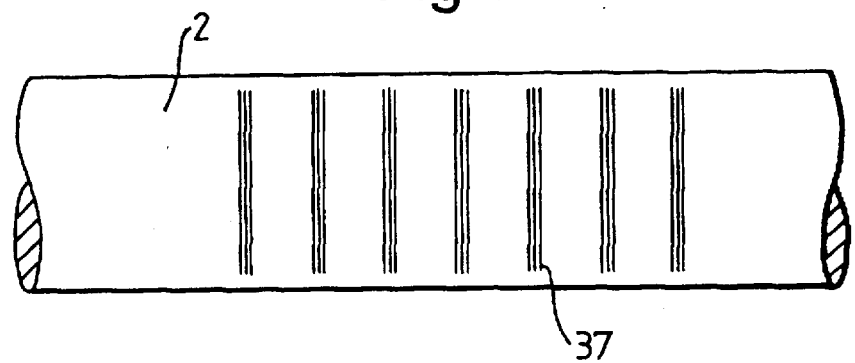
FIG. 5 is a perspective view showing the layout of typical Bragg gratings along a selected fiber within.

FIG. 5 shows one such grating 37 which when subjected to strain within the ribbon cable 12 will deform and thus produce a change in the reflected light characteristic of that fibre 2 which will be recognized by the detection system 20 and 34 as changes in strain levels.

What is claimed is:

1. A method of measuring structural defects of a structure including the steps of:

a) attaching to said structure at least one structural defect sensor each comprising a fibre optic cable in turn comprising a plurality of longitudinally extending optical fibres mounted in a predetermined spaced apart substantially parallel co-planar array, selected fibres having Bragg Gratings located along their length in their surfaces, one side of said array being adapted for attachment to a surface of a structure to be tested, b) coupling to one end of the fibre optic cable of each sensor a light source, and an optical sensor having time domain measuring and multiplexing capabilities, c) monitoring a variation of a light parameter measured by said optical detector using time domain measurement to locate the position of a crack along a fibre and using multiplexing for determining from which fibre the light source is being analyzed, d) monitoring point strains by measuring a characteristic of light reflected from said Bragg Gratings, and including the further steps of locating a second light source, with a corresponding optical switching unit and a detector, at another end of said cable thereby enabling reflections of light from both ends of said cable to be monitored and thereby the positioning of any discontinuity on an individual fibre within said cable to be accurately established.

2. A structural defect sensor comprising a fibre optic cable in turn comprising a plurality of longitudinally extending optical fibres mounted in a predetermined spaced apart substantially parallel co-planar array one side of said array being adapted for attachment to a surface of a structure to be tested, selected fibres having Bragg Gratings thereon, said sensor also comprising an optical switch, a light source and a detector unit located at one end of the fibre optic cable, wherein said sensor comprises an additional light source, optical switch and detector located at another end of said cable.

* * * * *